(12) United States Patent
Swaminathan et al.

(10) Patent No.: US 10,443,577 B2
(45) Date of Patent: Oct. 15, 2019

(54) SYSTEMS AND METHODS FOR IMPROVED WIND POWER GENERATION

(71) Applicant: General Electric Company, Schenectady, NY (US)

(72) Inventors: Krishna Kumar Swaminathan, Bangalore (IN); Deepak Raj Sagi, Bangalore (IN); Pritesh Jain, Bangalore (IN); Sridhar Dasaratha, Bangalore (IN); Nitika Bhaskar, Bangalore (IN); Rahul Kumar Srivastava, Bangalore (IN); Milesh Shrichandra Gogad, Gurgaon (IN)

(73) Assignee: General Electric Company, Schenectady, NY (US)

( * ) Notice: Subject to any disclaimer, the term of this patent is extended or adjusted under 35 U.S.C. 154(b) by 291 days.

(21) Appl. No.: 15/198,749

(22) Filed: Jun. 30, 2016

(65) Prior Publication Data

US 2017/0016430 A1   Jan. 19, 2017

(30) Foreign Application Priority Data

Jul. 17, 2015 (IN) .......................... 3662/CHE/2015

(51) Int. Cl.
*G06F 17/50* (2006.01)
*F03D 17/00* (2016.01)
(Continued)

(52) U.S. Cl.
CPC .............. *F03D 17/00* (2016.05); *F03D 7/047* (2013.01); *G06N 20/00* (2019.01); *G06Q 10/04* (2013.01);
(Continued)

(58) Field of Classification Search
CPC ................................................ G06F 2217/78
(Continued)

(56) References Cited

U.S. PATENT DOCUMENTS 7,035,730 B2*   4/2006   White .................. F01N 11/007
                                                       60/276
8,200,435 B2   6/2012   Stiesdal
(Continued)

FOREIGN PATENT DOCUMENTS

CN   101706335 A   5/2010
CN   102102626 A   6/2011
(Continued)

OTHER PUBLICATIONS

Cao et al., "Wind power ultra-short-term forecasting method combined with pattern-matching and ARMA-model", PowerTech (POWERTECH), 2013 IEEE Grenoble, pp. 1-4, Jun. 16-20, 2013, Grenoble.
(Continued)

*Primary Examiner* — Andy Ho
(74) *Attorney, Agent, or Firm* — Dority & Manning, P.A.

(57) ABSTRACT

A wind power generation system includes one or both of a memory or storage device storing one or more processor-executable executable routines, and one or more processors configured to execute the one or more executable routines which, when executed, cause acts to be performed. The acts include receiving weather data, wind turbine system data, or a combination thereof; transforming the weather data, the wind turbine system data, or the combination thereof, into a data subset, wherein the data subset comprises a first time period data; selecting one or more wind power system models from a plurality of models; transforming the one or more wind power system models into one or more trained models at least partially based on the data subset; and executing the one or more trained models to derive a forecast, wherein the forecast comprises a predicted electrical power production for the wind power system.

20 Claims, 3 Drawing Sheets

(51) Int. Cl.
*G06N 20/00* (2019.01)
*G06Q 10/04* (2012.01)
*G06Q 50/06* (2012.01)
*F03D 7/04* (2006.01)
*F03D 7/02* (2006.01)

(52) U.S. Cl.
CPC ............ *G06Q 50/06* (2013.01); *F03D 7/028* (2013.01); *F03D 7/045* (2013.01); *F03D 7/048* (2013.01); *F05B 2260/821* (2013.01); *F05B 2260/8211* (2013.01); *F05B 2260/84* (2013.01); *F05B 2270/335* (2013.01)

(58) Field of Classification Search
USPC .......................................................... 703/18
See application file for complete search history.

(56) References Cited

U.S. PATENT DOCUMENTS

| | | | | |
|---|---|---|---|---|
| 8,606,418 | B1* | 12/2013 | Myers ................. | F03D 7/046 700/287 |
| 9,460,478 | B2* | 10/2016 | Zhang ................. | G06Q 50/06 |
| 2010/0274573 | A1* | 10/2010 | Feied ................. | G06Q 50/22 705/2 |
| 2013/0035798 | A1 | 2/2013 | Zhou et al. | |
| 2014/0025354 | A1 | 1/2014 | Padullaparthi et al. | |
| 2014/0244188 | A1* | 8/2014 | Bai ................. | F03D 17/00 702/60 |
| 2014/0336833 | A1* | 11/2014 | Marinopoulos ......... | G01W 1/10 700/291 |
| 2015/0186904 | A1* | 7/2015 | Guha ................ | G06Q 10/06316 705/7.26 |

FOREIGN PATENT DOCUMENTS

| | | | |
|---|---|---|---|
| CN | 102184453 | A | 9/2011 |
| CN | 102521671 | A | 6/2012 |
| CN | 102102626 | B | 8/2012 |
| CN | 102682207 | A | 9/2012 |
| CN | 102005760 | B | 12/2012 |
| CN | 102055188 | B | 12/2012 |
| CN | 102938093 | A | 2/2013 |
| CN | 102170130 | B | 3/2013 |
| CN | 102269124 | B | 4/2013 |
| CN | 102411729 | B | 10/2013 |
| CN | 102545211 | B | 11/2013 |
| CN | 103440531 | A | 12/2013 |
| CN | 103455716 | A | 12/2013 |
| CN | 103714400 | A | 4/2014 |
| CN | 103871002 | A | 6/2014 |
| CN | 104021424 | A | 9/2014 |

OTHER PUBLICATIONS

Togelou A et al., "Wind Power Forecasting in the Absence of Historical Data", Sustainable Energy, IEEE Transactions on, vol. 3, Issue:3, pp. 416-421, Jul. 2012.
European Search Report and Opinion issued in connection with corresponding EP Application No. 16179511.7 dated Nov. 2, 2016.
Machine Translation and First Office Action and Search issued in connection with corresponding CN Application No. 201610557725.X dated Jan. 22, 2019.

* cited by examiner

SYSTEMS AND METHODS FOR IMPROVED WIND POWER GENERATION

BACKGROUND

The subject matter disclosed herein relates to wind power generation systems, and more specifically to techniques suitable for enhancing operations of the wind power generation systems.

A power grid may include a wind power generation system suitable for providing power, such as electrical power, based on wind currents. Wind currents may vary depending on weather conditions, and thus the wind power generation system may provide for more or less power depending on the weather conditions. For example, during peak wind conditions, the wind power generation system may provide for above-average electric power. Likewise, decreases in wind may result in reduced electric power provided to the power grid. Accordingly, as wind speed and load varies, a grid frequency may vary. The wind power generation system may provide for forecasting and control of the power delivered into the power grid by forecasting power and dynamically managing energy supply to provide for a more efficient power grid system. It would be advantageous to improve upon the wind power generation system.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

A first embodiment provides a wind power generation system that includes one or both of a memory or storage device storing one or more processor-executable executable routines, and one or more processors configured to execute the one or more executable routines which, when executed, cause acts to be performed. The acts to be performed include receiving weather data, wind turbine system data, or a combination thereof, from one or more sensors sensing wind conditions, wind turbine system operations, or a combination thereof, disposed in a wind power system; transforming the weather data, the wind turbine system data, or the combination thereof, into a data subset, wherein the data subset comprises a first time period data; selecting one or more wind power system models from a plurality of models; transforming the one or more wind power system models into one or more trained models at least partially based on the data subset; and executing the one or more trained models to derive a forecast, wherein the forecast comprises a predicted electrical power production for the wind power system.

A second embodiment provides a method. The method includes receiving weather data, wind turbine system data, or a combination thereof, from one or more sensors sensing wind conditions, wind turbine system operations, or a combination thereof, disposed in a wind power system. The method further includes transforming the weather data, the wind turbine system data, or the combination thereof, into a data subset, wherein the data subset comprises a first time period data. The method additionally includes selecting one or more wind power system models from a plurality of models, and transforming the one or more wind power system models into one or more trained models at least partially based on the data subset. The method also includes executing the one or more trained models to derive a forecast, wherein the forecast comprises a predicted electrical power production for the wind power system.

A third embodiment provides a tangible, non-transitory, computer-readable medium storing instructions comprising instructions that when executed by a processor cause the processor to receive environmental condition data, wind turbine system data, or a combination thereof, from one or more sensors sensing wind conditions, wind turbine system operations, or a combination thereof, disposed in a wind power system. The instructions further cause the processor to transform the weather data, the wind turbine system data, or the combination thereof, into a data subset, wherein the data subset comprises a first time period data. The instructions additionally cause the processor to select one or more wind power system models from a plurality of models, and to transform the one or more wind power system models into one or more trained models at least partially based on the data subset. The instructions also cause the processor to execute the one or more trained models to derive a forecast, wherein the forecast comprises a predicted electrical power production for the wind power system.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
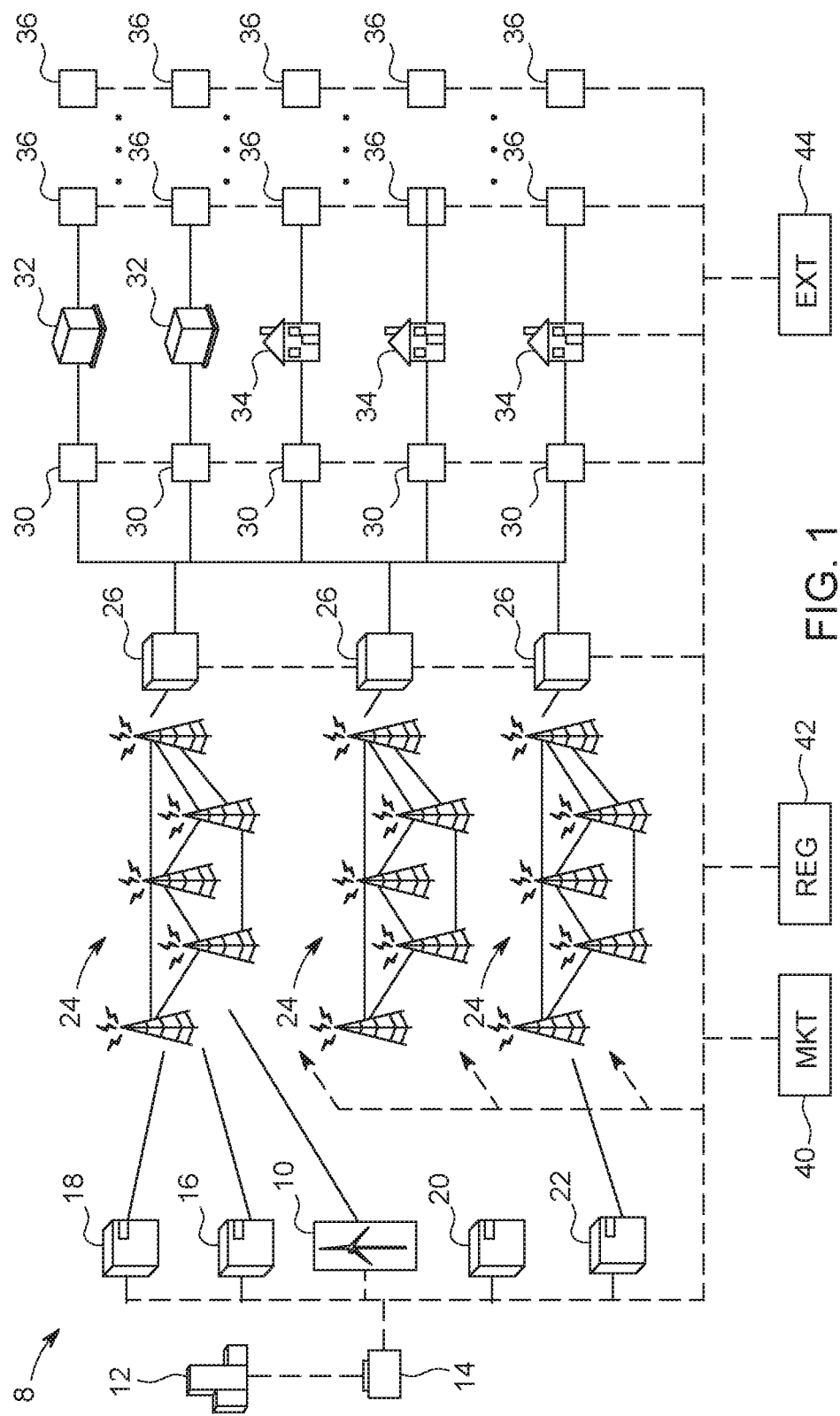
FIG. 1 is a block diagram of an embodiment of a power generation, transmission, and distribution system which includes a wind power generation system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure describes techniques suitable for improving a wind power generation system by providing for more accurate and timely wind power forecasting techniques. In one example, dynamic forecasting models are described herein, which may include self-adapting models suitable for improved forecasts, including forecasts with varying wind conditions. In certain embodiments, data from wind turbine systems containing, for example, environmental variables such as wind speed, wind direction, temperature, and the like, may be obtained. Likewise, data from operating conditions such as availability of the wind turbine systems, type of wind turbine systems in use; current wind power production, and the like, may be obtained. The data may then be processed through a data quality/data filtering system, which may select a subset of data more suitable for forecasting wind power based on certain conditions and/or events described in more detail below.

Likewise, a subset of models may be continuously selected for improved forecasting during a certain time period. A forecasting engine may then use the subset of models with the filtered data subset as input to the models. Once the model(s) are chosen, a training system may be executed periodically at a configurable time period (e.g., every 3 hours) using historical data of a derived time period (e.g., 1-4 weeks). A forecasting engine may automatically derive a time period size (e.g., 1-4 weeks) of data to use for training that may result in more accurate modeling. The training system may then generate model parameters and other model-based properties associated with the data and the models in use. As forecasts are derived (e.g., wind power production forecasts), a feedback system may apply the forecasts as a feedback loop to improve the forecast engine. Subsequent forecasts may thus use both the incoming data and past performance data to change models/model parameters in the forecast engine automatically, thus improving forecasting for the wind power system. Additionally, when the forecast engine is initiated at a new site, it may begin obtaining data and use features in the obtained data to choose a model or combination of models for improved forecasting.

With the foregoing in mind, it may be useful to describe an embodiment of a system that incorporates the techniques described herein, such as a power grid system 8 illustrated in FIG. 1. The power grid 8 may include a wind power system or "wind farm" 10. In use, the wind power system 10 may convert kinetic energy from the wind into electrical power. The electrical power may then be delivered via power grid system 8.

For example, the power grid system 8 may include one or more utilities 12. The utility 12 may provide for power production and oversight operations of the power grid system 8. Utility control centers 14 may monitor and direct power produced by one or more power generation stations 16 and wind power systems 10. The power generation stations 16 may include conventional power generation stations, such as power generation stations using gas, coal, biomass, and other carbonaceous products for fuel. The power generation stations 16 may additionally include alternative power generation stations using solar power, hydroelectric power, geothermal power, and other alternative sources of power (e.g., renewable energy) to produce electricity. Other infrastructure components may include a water power producing plant 20 and geothermal power producing plant 22. For example, water power producing plants 20 may provide for hydroelectric power generation, and geothermal power producing plants 22 may provide for geothermal power generation.

The power generated by the power generation stations 16, 18, 20, and 22 may be transmitted through one or more power transmission grids 24. A power transmission grid 24 may cover a broad geographic region or regions, such as one or more municipalities, states, or countries. The transmission grid 24 may also be a single phase alternating current (AC) system, but most generally may be a three-phase AC current system. As depicted, the power transmission grid 24 may include a series of towers to support a series of overhead electrical conductors in various configurations. For example, extreme high voltage (EHV) conductors may be arranged in a three conductor bundle, having a conductor for each of three phases. The power transmission grid 24 may support nominal system voltages in the ranges of 110 kilovolts (kV) to 765 kilovolts (kV). In the depicted embodiment, the power transmission grid 24 may be electrically coupled to distribution systems (e.g., power distribution substations 26). A power distribution substation 26 may include transformers to transform the voltage of the incoming power from a transmission voltage (e.g., 765 kV, 500 kV, 345 kV, or 138 kV) to primary (e.g., 13.8 kV or 4160V) and secondary (e.g., 480V, 230V, or 120V) distribution voltages.

Advanced metering infrastructure meters (e.g., smart meters) 30 may be used to monitor and communicate power related information based on electric power delivered to commercial consumers 32 and residential consumers 34. For example, the smart meters 30 may include two-way communications with the grid system 8 and the utilities 12 suitable for communicating a variety of information, including power usage, tampering, power outage notification, power quality monitoring, and the like. The smart meters 30 may additionally receive information, for example, demand response actions, time-of-use pricing information, remote service disconnects, and the like.

The customers 32, 34 may operate a variety of power consuming devices 36, such as household appliances, industrial machinery, communications equipment, and the like. In certain embodiments, the power consuming devices 36 may be communicatively coupled to the grid system 8, the utilities 12, and/or the meters 30. For example, the power consuming devices 36 may include switches that may be actuated remotely to turn on/off the devices 36 and/or to vary power consumption (e.g., lower or raise heating ventilation and air conditioning [HVAC] temperature set points). The smart meters 30 and the power consuming devices 36 may be communicatively coupled, for example, through a home area network (HAN), (for residential customers 34), wireless area network (WAN), powerline network, local area network (LAN), mesh network and the like.

As mentioned earlier the wind power system 10 may be used as a source of electrical power based on the kinetic energy of wind. Because of wind fluctuations, the electrical power delivered via the wind power system 10 may also fluctuate. For example, gusty conditions may increase electrical power, while low or no wind conditions may reduce the electrical power produced via the wind power system 10. The grid system 8 may operate more efficiently if the wind power system 10 would more accurately forecast upcoming power production. Indeed, in some jurisdictions, such power forecasting is regulated via the regulatory systems 42 to occur, for example, at certain time periods such as every 30 minutes, every hour, every 3 hours, every 8 hours, and so on. External systems 44 are also depicted, which may include energy markets, energy credit entities (e.g., "green" credits), insurance entities, and the like. Improved power production forecasting for the wind power system 10 may enable more accurate trading of energy credits, improved pricing of energy, and lower insurance rates. The techniques described herein provide for systems and methods that may more accurately predict upcoming power production for the wind power system 10. By more accurately predicting future power production, the grid system 8 may manage power in a more efficient and timely manner.

Figure 2:
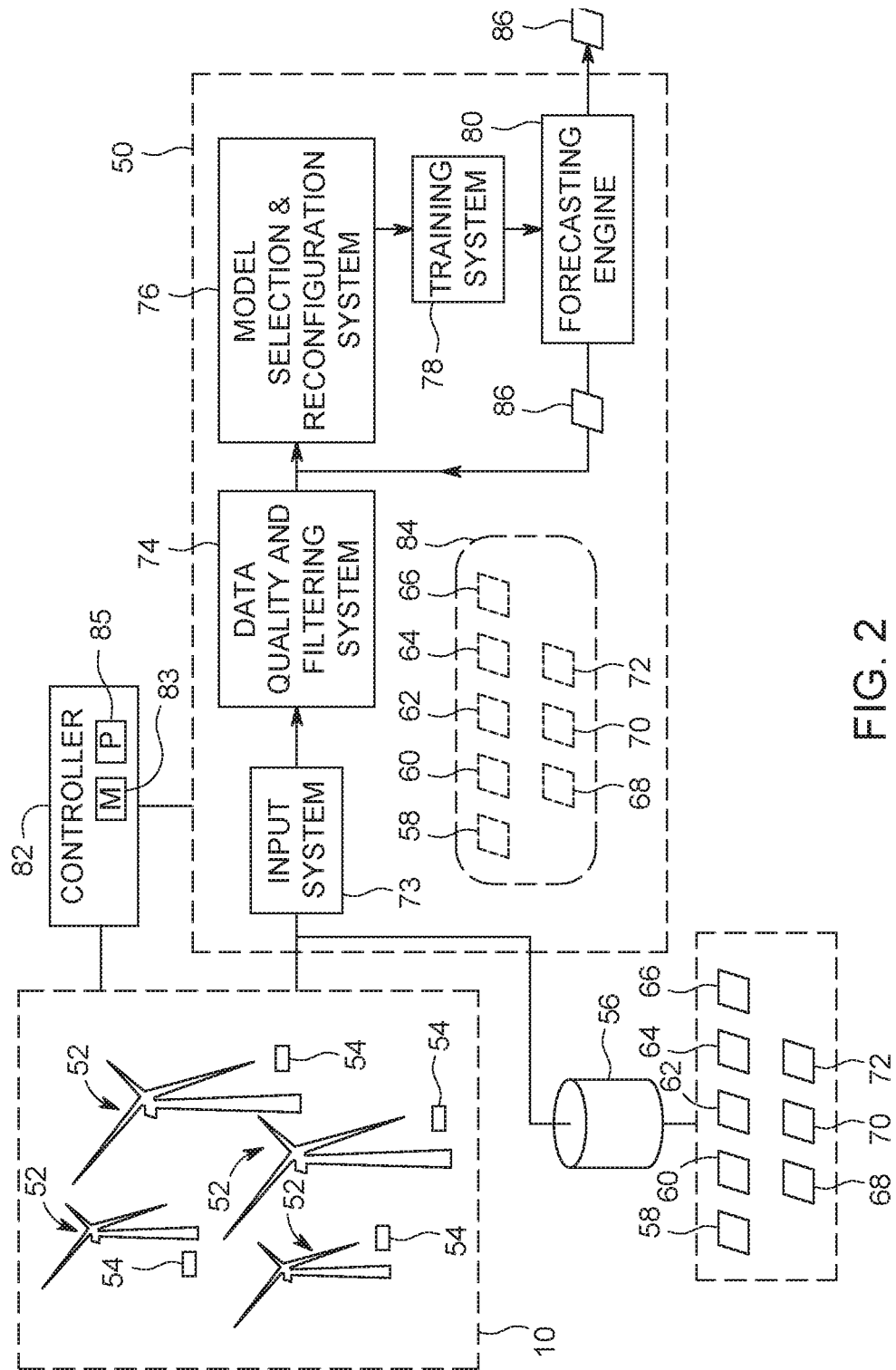
FIG. 2 is a block diagram of an embodiment of the wind power forecasting system depicted in FIG. 1 communicatively coupled to a wind turbine farm system.

FIG. 2 depicts a block diagram of an embodiment of a wind power forecasting system 50 communicatively coupled to one or more wind turbine systems 52. More specifically each of the wind turbine systems 52 may include sensors 54 that may be communicatively coupled to the forecasting system 50 either directly or indirectly (e.g., via data repositories or data services). The sensors 54 may measure environmental conditions and/or weather data related to the wind turbine 52, such as wind speed, wind direction, atmospheric pressure, temperature, humidity, precipitation over a time period, atmospheric conditions (e.g., cloud ceiling via a ceilometers, drop size distribution, visibility) or a combination thereof. The sensors 54 may additionally or alternatively include sensors suitable for measuring parameters related to the turbine system 52, such as blade revolutions per minute, temperature, vibration, torque, hours used, electrical power production, and so on.

Also illustrated is a data repository 56 that is communicatively coupled to the forecasting system 50. The data repository 56 may store data, for example, of measurements captured via sensors 54, including historical data. The data repository 56 may also store turbine system 52 information, such as maintenance schedules, wind turbine types, wind turbine hardware and/or software configurations, availability, operating state (e.g., operational, partially operational, inoperative), and so on. The data repository 56 may additionally store one or more models 58, 60, 62, 64, 66, 68, 70, 72. The one or more models 58, 60, 62, 64, 66, 68, 70, 72 may include forecasting models suitable for forecasting electrical power production of one or more turbine systems 52, as described in more detail below. Additionally, the data store 56 may store regulatory data, such as regulatory time periods to deliver forecasting data.

The forecasting system 50 may include a series of subsystems 73, 74, 76, 78, 80. The forecasting system 50 and subsystems 73, 74, 76, 78, 80 may, in one embodiment, be implemented as software systems or computer instructions executable via a hardware processor and stored in a memory. For example, the systems 73, 74, 76, 78, 80 may be implemented as software executable via a controller 82 (e.g., programmable logic controller [PLC]) communicatively coupled to one or more of the turbine systems 10. The controller 82 may control operations of the wind turbine system(s) 52, for example, by controlling power inverter circuitry, electrical filtering circuitry, battery charging circuitry, and so on. The controller 82 may include a memory 83 suitable for storing computer instructions and other data, and a processor 85 suitable for executing the computer instructions. The systems 73, 74, 76, 78, 80 may additionally or alternatively be stored and executed by other computing devices, such as a workstation, personal computer (PC), laptop, notebook, tablet, cell phone, and the like. Further, the systems 73, 74, 76, 78, 80 may be implemented as hardware systems, for example, via FPGAs, custom chips, IC's and the like.

In use, data from the sensors 54 and information from the data store 56 may be communicated to the input system 73. Accordingly, the forecasting system 50 may be kept updated on current environmental conditions (e.g., weather conditions), wind turbine operating conditions, and/or turbine system 52 specific data (e.g., hardware/software configurations, availability, operating state, maintenance schedules, regulatory data), or a combination thereof. The input system 73 may then provide the data to the data quality and filtering system 74. The data quality and filtering system 74 may "clean" and more generally improve a quality of the incoming data by, for example, removing outlying data points, adding certain missing data points, and the like. The data quality and filtering system 74 may additionally select a subset of data for subsequent analysis, thus improving data processing speed and efficiency.

The selection of a subset of data may include accounting for current meteorological events, such as a wind ramp event. During a wind ramp event, wind conditions may change from a period of little wind to a period of high wind. Accordingly, rather than use a larger data set that incorporates data when wind conditions were low, the data quality and filtering system 62 may select a smaller subset of data that includes mostly wind ramping data to enhance accuracy. In one embodiment an accuracy analysis may be used to select a first time period data, for example, that may include mostly wind ramping data as the data subset. The accuracy analysis may select a first time period, for example, by beginning with current data (e.g., Time $T_0$ data) and working backwards until the predictive accuracy decays (e.g., at time $T_N$). Accordingly, the first time period may include data from $T_0$ to $T_N$. Ramping calculations may additionally or alternatively be used. Indeed, a ramping calculation may be applied, which may derive changes in wind conditions from low to high or vice versa, and then cull data to account for the new conditions.

The ramping calculation may include using slopes of wind values, first order derivatives, and so on, to derive when wind changes from one state (e.g., low wind) into a second state (e.g., high wind), or vice versa. Higher slope values or first order derivatives may be used to determine that current data is becoming too different from previous data; hence shorter data sets may be used to enhance forecasting accuracy. Mean calculation, such as calculating a mean value for data sets, may be similarly used. For example, a time series of incoming data may be used to calculate a mean value for the time series, and the mean value may then be compared to mean values of previous time series data to determine if changes are occurring. Slope and/or mean value changes above a certain range of values may then result in smaller data subsets being used.

The selection of a subset of data may additionally include accounting for certain maintenance events. For example, if one or more of the turbine systems 52 are undergoing maintenance or will undergo maintenance shortly (e.g., within the period of prediction), then the power predicted will be lower, and further data related to power production for the specific turbine system 52 that is undergoing maintenance may not be used in prediction. Likewise, when the turbine system 52 is back online, then the data may be adjusted to incorporate, for example, historical data from the turbine system 52 that is now online. Likewise, a second time period of data may be selected by applying accuracy analysis, slope-based analysis, the mean value based analysis, the first order derivative, or the combination thereof. For example, the accuracy analysis, the slope-based analysis, the mean value based analysis, the first order derivative, or the combination thereof, may detect when the first time period data is not as accurate as a second time period data, where the second time period data is, for example, having more current data points as compared to the first time period data. The time periods may overlap. For example, the first time period may begin at time $T_0$ and end at time $T_N$, while the second time period may begin at time $T_{N-X}$ and end at time $T_{N+Y}$, where X, Y may be equal to 0 or a positive value. By applying this dynamic data filtering or subset-creation technique, improved forecasting accuracy may be provided.

The model selection and reconfiguration system 76 may then select one or more of the models 58, 60, 62, 64, 66, 68, 70, 72 to derive a model subset 84. The models 58 may include turbine-level models. These turbine-level models 58 are turbine system 52 specific models which may be executed independently for each turbine system 52 in the wind power system 10 and are suitable for forecasting power generated by each of the turbine systems 52 individually. The power generated for each of the turbine systems 52 may then be summed to generate a predictive total power for the wind power system 10. Turbine level models 58 may include wind speed prediction models 60 and/or wind power prediction models 62 which may both be used to predict power (e.g., electrical power) produced by the turbine system 52 directly. In some embodiments, algorithms or rules (e.g., expert system rules, fuzzy logic rules, if/then rules) may automatically decide when to switch between wind speed models 60 and wind power models 62, based on patterns in the input data received (e.g., sensor 54 measurements), such as quality or availability of wind speed measurements, turbine system 52 type, turbulence intensity, and so on. One example rule may derive the use of wind power models 62 if wind speed values are missing or if the values show too much turbulence, and may use wind speed models 60 otherwise.

Wind speed based models 60 include models which use the wind speed experienced by each turbine system 52 as an input, and may then output forecast wind speeds in the near future (e.g., next minute, 15 minutes, 30 minutes, 1 hour, 2 hours, 1 day). The wind speeds thus obtained may be converted to turbine power using a power curve for each of the turbine systems 52. The power curve may provide a curve or graph detailing how much power the turbine system 52 would produce based on a given wind speed. For example, an X-axis of the power curve may list wind speed, and a Y-axis may list electrical power. By finding a point in the curve based on the forecasted wind speed (e.g., X-axis), the predicted wind power may be found in the Y-axis. As wind speed measurements at the turbine system 52 may be inaccurate due to errors, for example, in anemometer readings, transfer functions may be applied additional to wind speed, to account for such errors, and the result may then be used to predict electrical power.

Wind direction prediction models 64 may include models suitable for forecasting wind direction. These forecasts can be combined, for example, with wind speed forecast models 60, to obtain improved estimates of power produced per turbine system 52. Availability forecasting models 66 may use current turbine system 52 availability and/or operating state (e.g., fully operational, partially operational, undergoing maintenance) of the turbine systems 52 to forecast future turbine system 52 availabilities (e.g., "up" time). The availability forecast can be used to down-correct power predictions to get more realistic estimates of actual power produced, for example, in situations where turbine systems 52 may be placed offline or are about to undergo scheduled/unscheduled maintenance. To predict unscheduled maintenance events (e.g., trips), statistical methods by themselves may not be sufficiently accurate. In these situations, data from other sensors, such as ambient temperature measurements data, lifespan prediction curves, fault tree analysis, and the like, may be used to build condition based monitoring (CBM) models 68 to predict unscheduled maintenance events, and therefore forecast availability more accurately.

Actual power curve models 70 may also be used. An actual power curve describing a relation between wind speeds to power produced for each of the turbine systems 52 at a given time point may be different from published power curves. Several models may be constructed, suitable for computing the actual power curve at a given time point. Some models types that may be used for the models 70 include Persistence based power curve models described in more detail below, models that model the power curve based on a logistic function between wind speed and power, and models that model the power curve using a Gaussian convolution of a manufacturer-provided power curve.

Farm level models 72 may also be provided, which can be applied to the turbine power system 10 overall as opposed to each individual turbine system 52 to forecast farm power for the turbine power system 10. In an embodiment, farm level models 72 may capture factors like availability, curtailment, and the like, during model creation (e.g., during model building via obtained data), obviating the need for explicit modeling for these factors. Farm level models 72 may also be more robust in the presence of "noisy" data as compared to turbine level models (e.g., models 58), as the farm level models 72 may average out errors made in predictions for individual turbines systems 52. Farm level models 72 may also account for power losses in collector systems, which may be around 1-4% of total farm power, thus leading to more accurate forecasts.

The models 58, 60, 62, 64, 66, 68, 70, and/or 72 may include persistence models, where data (e.g., wind speeds seen at the last available time point, power, wind direction, availability) are projected forward to the future (e.g., as predicted wind speeds, power, wind direction, availability). The models 58, 60, 62, 64, 66, 68, 70, and/or 72 may additionally or alternatively include autoregressive (AR), and/or autoregressive integrated moving average (ARIMA) based models, which include statistical models utilizing the values and errors at found previous time intervals (e.g., historical data stored in data repository 56) to predict future values. The AR/ARIMA models may assume stationarity (e.g., that the probability distribution of the time series does not change with time). The models 58, 60, 62, 64, 66, 68, 70, and/or 72 may also include autoregressive models for circular time series data (ARCS) models, autoregressive conditional heteroskedasticity (ARCH) models, autoregressive moving average (ARMA) models, generalized autoregressive conditional heteroskedasticity (GARCH) models, and/or moving-average (MA) models. The models 58, 60, 62, 64, 66, 68, 70, and/or 72 may include search based models that may search historical data for patterns which are similar to the currently occurring pattern, and use those patterns to generate forecasts. The models 58, 60, 62, 64, 66, 68, 70, and/or 72 may also include neural network models that may build a neural net between time series values in the training data, and use the neural network to generate forecasts.

The selection of the models 58, 60, 62, 64, 66, 68, 70, and/or 72 into the model subset 84 may provide for a model subset that is more predictively accurate in forecasting, for example, the power forecast for the wind power system or farm 10. The selection of the models may involve selecting by model type (e.g., selecting a subset of the set of model types 58, 60, 62, 64, 66, 68, 70, and/or 72), selecting from one or more from the same model type (e.g., selecting multiple models of any one or more of the model types 58, 60, 62, 64, 66, 68, 70, and/or 72), or a combination thereof. It is to be understood that the selection of the model subset 84 may be done on a continuous basis, such as every second, every minute, every 15 minutes, every 40 minutes, every hour, and so on. The model subset 84 selection may additionally be user configurable. That is, a user may determine the model subset 84 by selecting one or more models 58, 60, 62, 64, 66, 68, 70, and/or 72, including one or more models of the same type.

In addition to or alternative to evolving the models 58, 60, 62, 64, 66, 68, 70, and/or 72 by changing data used for training as described below, the forecasting system 50 can also include rules and/or algorithms to change the actual models 58, 60, 62, 64, 66, 68, 70, and/or 72 themselves. In one example, more data intensive models such as neural networks may be used when training data is relatively complete, and models more robust when using missing data such as AR/ARIMA models may be used in cases of missing data. The models 58, 60, 62, 64, 66, 68, 70, and/or 72 may also be evaluated for accuracy in real time, and algorithms to choose the best model 58, 60, 62, 64, 66, 68, 70, and/or 72 or combination thereof, automatically based on "best" forecasting may be used. By continuously selecting the subset 85 from all of the models 58, 60, 62, 64, 66, 68, 70, and/or 72, the techniques described herein may provide for a more accurate subset 84 that may provide increased predictive accuracy.

In one embodiment, the models 58, 60, 62, 64, 66, 68, 70, and/or 72 may be then further trained by the training system 78, for example, by applying the filtered data (e.g., data selected for improved accuracy) outputted by the data quality and filtering system 74. Depending on model type, the training may result in model coefficients that may improve forecasting accuracy. For example, ARIMA models may include coefficients p, d, q where p is an order of the autoregressive model (AR), d is a degree of differencing, and q is an order of a moving average model. Other ARIMA models, such as seasonal models, may include coefficients $(P, D, Q)_m$ where m refers to a number of periods in each season. Neural network models may include coefficients such as correlation coefficients, coefficients of determination, weight coefficients, and so on. Indeed, the models described herein may include certain coefficients pertaining to the type of model that may be trained by the training system 78.

The forecasting engine 50 may then execute trained models to derive one or more forecasts 86. The forecasts 86 may include predictive electrical power (e.g., total power production, amperage, voltage, frequency) for the one or more turbine systems 52 and/or for the wind power system 10, as well as wind direction forecasts, wind speed forecasts, turbulence forecasts, and the like. The forecasting engine 50 may be communicatively coupled to various grid system 8 entities, such as the regulatory entity 42, utilities 12, external systems 44, and the like, and may provide the forecasts 86 to these grid system 8 entities.

The forecasts 86 may meet regulatory requirements, for example, requirements such as India's Renewable Regulatory Fund (RRF) metric. India's RRF metric may define a predicted power production accuracy of 70% or more. Meeting accuracy goals may result in monetary incentives, while monetary penalties may be levied if accuracy goals are not met. The forecasts 86 may be provided 8 times every day (i.e., 8 times every 24 hours) at 15 minute intervals, with a minimum forecast interval of 1.5 hours. Other intervals, including custom intervals, may also be provided.

The forecasts 86 may additionally be provided in a feedback loop for the forecasting engine 50. For example, the forecasts 86 and actual results may be applied by the model selection and reconfiguration system 76 and/or by the training system 78 to re-select the subset 84 and/or to train the models. For example, the model selection and reconfiguration system 76 may determine, based on the feedback forecasts 86 and the actual results, that an improved model selection may include a different subset of the models 84, and may thus derive a new subset 84. The new model subset may then undergo training via the training system 86, as described above, and then may be executed by the forecasting engine 80 to derive new forecasts 86. By providing for forecasts 86 (and actual results) in a feedback loop, the techniques described herein may more accurately derive wind power system 10 forecasts 86.

Figure 3:
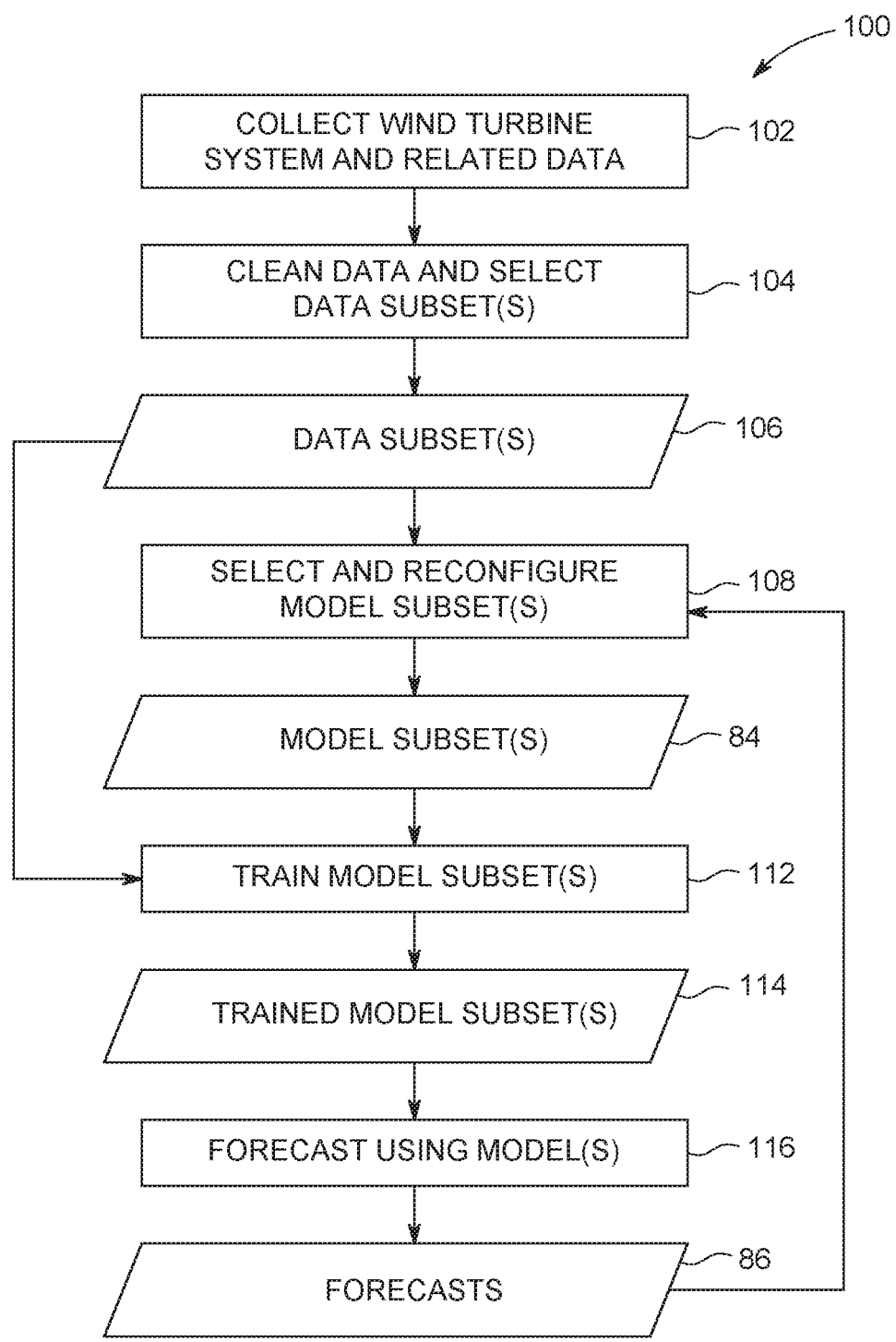
FIG. 3 is a flowchart of an embodiment of a process for improved wind power forecasting.

Turning now to FIG. 3, the figure depicts an embodiment of a process 100 that may be executed by the forecasting system 50. The process 100 may be stored in the memory 83 and executed by the processor 85 of the controller 82. In the depicted embodiment, the process 100 may collect (block 102) wind turbine system 10 data and other related data. For example, sensors 54 may be used to collect current data, while the data repository 56 may be used to collect historical data. As mentioned earlier, the collected data may include current and historical environmental conditions, current and historical wind turbine operating conditions, and/or current and historical turbine system 52 specific data (e.g., hardware/software configurations, availability, operating state, maintenance schedules, regulatory data), or a combination thereof.

The process 100 may then "clean" the collected data and select (block 104) one or more data subsets 106. For example, the collected data may be cleaned by removing outlying and/or noisy data points, adding certain missing data points, smoothing data points, and so on. The one or more data subsets 106 may be selected to account for events such as wind ramp events, wind turbulence events, wind direction change events, storms, low wind events, planned and unplanned turbine system 52 maintenance events, and so on. The data subsets 106 may include time periods (e.g., last day, last 12 hours, last 8 hours, last 4 hours, last 2 hours, last hour, last half hour, last 15 minutes, last 10 minutes, last 5 minutes or less) of data points that are more optimized to account for the aforementioned events. Slope changes, mean value changes, first order derivative changes, or a combination thereof, may be used to determine the data subsets 106.

The process 100 may then select and reconfigure (block 108) one or more model subsets 84. For example, the model subsets 84 may be selected based on accuracy of the models during certain time periods (e.g., last day, last 12 hours, last 8 hours, last 4 hours, last 2 hours, last hour, last half hour, last 15 minutes, last 10 minutes, last 5 minutes or less). Rules or algorithms may also be used to derive the model subsets 84, such as rules that add data intensive models such as neural networks to the model subsets 84 when training data is relatively complete, and models more robust when using missing data, such as AR/ARIMA models.

The model subsets 84 may then be trained (block 112). For example, the data subsets 106 may be used to train the model subsets 84 to derive one or more coefficients that customize the model subsets 110 to the training data (e.g., data subsets 106). Training may occur cyclically (e.g., every day, every 12 hours, every 8 hours, every 4 hours, every 2 hours, every hour, every half hour, every 15 minutes, every 10 minutes, every 5 minutes or less). Training (block 112) may also occur during installation (e.g., commissioning) of the forecasting system 50, or at a user's request. Trained model subsets 114 may then be provided to the forecasting engine 80, and the trained model subsets 114 may forecast (block 116) certain predictions as data is received, for example, via sensors 54. Forecasts 86 may then be used to more optimally control the wind power system 10, and may also be provided to utilities 12, regulatory entities 42, and external systems 44. The forecasts 86 may also be used in a feedback loop to improve further selection and reconfiguration (block 108) of the model subsets 84.

Technical effects of the disclosed embodiments include a wind power system that may improve forecasting of future electrical power production. A data quality and filtering system may transform certain data, such as wind condition data, wind turbine system data, or a combination thereof, into a data subset by analyzing the data to provide focused data that is more predictive of certain wind conditions and/or wind turbine system conditions. Likewise, a model selection and reconfiguration system may select and/or reconfigure one or more wind power system models to be more accurately predictive of, for example, the electrical power produced by the wind power system during certain time periods. The selected models may then be used to derive forecasts of the predicted electrical power produced by the wind power system. The forecasts may then be used in a feedback loop to further improve the model selection and/or reconfiguration.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A wind power forecasting system communicatively coupled to one or more wind turbine systems, wherein each of the one or more wind turbine systems comprises sensors for sensing environmental conditions or parameters related to the respective wind turbine system, the system comprising:
   one or both of a memory or storage device storing one or more processor-executable executable routines; and
   one or more processors configured to execute the one or more processor-executable routines which, when executed, cause acts to be performed comprising:
      receiving weather data, wind turbine system data, or a combination thereof, from the sensors;
      transforming the weather data, the wind turbine system data, or the combination thereof, into a data subset, wherein the data subset comprises a first time period data corresponding to a wind ramp event, wherein the transforming step comprises applying a slope-based analysis, a first order derivative, or a combination thereof, and wherein the data subset is shortened to enhance accuracy in case of higher slop values or higher first order derivatives of wind values;
      selecting one or more wind power system models from a plurality of models;
      transforming the one or more wind power system models into one or more trained models at least partially based on the data subset; and
      executing the one or more trained models to derive a forecast, wherein the forecast comprises a predicted electrical power production for the wind turbine systems.

2. The system of claim 1, wherein transforming the weather data, the wind turbine system data, or the combination thereof, into the data subset comprises applying an accuracy analysis to the weather data, to the wind turbine system data, or to the combination thereof, to select the first time period data.

3. The system of claim 1, wherein the acts to be performed comprise comparing a first slope of the first time period data to a second slope of a second time period data, comparing a first mean value of the first time period data to a second mean value of the second time period data, comparing a first first order derivative of the first time period data to a second first order derivative of the second time period data, or a combination thereof, to select the first time period data, and wherein the second time period data comprises a different time period from the first time period.

4. The system of claim 1, wherein selecting the one or more wind power system models comprises selecting the one or more wind power system models based on a predictive accuracy of the one or more wind power system models over the first time period data, based on a number of data points in the data subset, based on an amount of noise in the data subset, or a combination thereof.

5. The system of claim 1, wherein the acts to be performed further comprise updating at least one of the one or more wind power system models based on the forecast.

6. The system of claim 1, wherein the one or more wind power system models comprise a wind speed prediction model, a wind power prediction model, a wind direction prediction model, an availability forecasting model, a condition based monitoring (CBM) model, an actual power curve model, a farm level model, or a combination thereof.

7. The system of claim 6, wherein the wind speed prediction model, the wind power prediction model, the wind direction prediction model, the availability forecasting model, the condition based monitoring (CBM) model, the actual power curve model, the farm level model, or the combination thereof, comprise an autoregressive (AR) model, an autoregressive integrated moving average (ARIMA) model, an autoregressive models for circular time series data (ARCS) model, an autoregressive conditional heteroskedasticity (ARCH) model, an autoregressive moving average (ARMA) model, a generalized autoregressive conditional heteroskedasticity (GARCH) model, a moving-average (MA) model, a neural network, a search-based model, or a combination thereof.

8. The system of claim 1, wherein the forecast is configured to meet a Renewable Regulatory Fund (RRF) metric, a regulatory metric, or a combination thereof.

9. The system of claim 1, further comprising a controller comprising the one or more processors, the one or both of the memory or storage device, or a combination thereof, wherein the controller is configured to control the wind turbine systems.

10. A method of foresting an electrical power production for wind turbine systems, comprising:
   receiving weather data, wind turbine system data, or a combination thereof, from sensors;
   transforming the weather data, the wind turbine system data, or the combination thereof, into a data subset, wherein the data subset comprises a first time period data corresponding to a wind ramp event, wherein the transforming step comprises applying a slope-based analysis, a first order derivative, or a combination thereof and wherein the data subset is shortened to enhance accuracy in case of higher slope values or higher first order derivatives of wind values;

selecting one or more wind power system models from a plurality of models;

transforming the one or more wind power system models into one or more trained models at least partially based on the data subset; and executing the one or more trained models to derive a forecast, wherein the forecast comprises a predicted electrical power production for the wind turbine systems.

11. The method of claim 10, wherein transforming the weather data, the wind turbine system data, or the combination, into the data subset comprises applying an accuracy analysis, a slope-based analysis, a mean value based analysis, a first order derivative, or a combination thereof.

12. The method of claim 11, wherein applying the slope-based analysis, the mean value based analysis, the first order derivative, or the combination thereof, comprises comparing a first slope of the first time period data to a second slope of a second time period data, comparing a first mean value of the first time period data to a second mean value of the second time period data, comparing a first first order derivative of the first time period data to a second first order derivative of the second time period data, or a combination thereof, wherein the second time period data comprises a different time period from the first time period.

13. The method of claim 10, wherein selecting the one or more wind power system models comprises analyzing a predictive accuracy of the one or more wind power system models over the first time period data, analyzing a number of data points in the data subset, analyzing an amount of noise in the data subset, or a combination thereof.

14. The method of claim 10, further comprising updating at least one of the one or more wind power system models based on the forecast.

15. The method of claim 10, wherein the one or more wind power system models comprise a wind speed prediction model, a wind power prediction model, a wind direction prediction model, an availability forecasting model, a condition based monitoring (CBM) model, an actual power curve model, a farm level model, or a combination thereof.

16. A tangible, non-transitory, computer-readable medium comprising instructions that when executed by a processor cause the processor to:

receive weather data, wind turbine system data, or a combination thereof, from sensors;

transform the weather data, the wind turbine system data, or the combination thereof, into a data subset, wherein the data subset comprises a first time period data corresponding to a wind ramp event, wherein the transformation comprises applying a slope-based analysis, a first order derivative, or a combination thereof; and wherein the data subset is shortened to enhance accuracy in case of higher slope values or higher first order derivatives of wind values;

select one or more wind power system models from a plurality of models;

transform the one or more wind power system models into one or more trained models at least partially based on the data subset; and execute the one or more trained models to derive a forecast, wherein the forecast comprises a predicted electrical power production for wind turbine systems.

17. The tangible, non-transitory, computer-readable medium of claim 16, wherein the instructions that when executed by the processor cause the processor to transform the weather data, the wind turbine system data, or the combination, into the data subset, comprise instructions that when executed by the processor cause the processor to apply an accuracy analysis, a slope-based analysis, a mean value based analysis, a first order derivative, or a combination thereof.

18. The tangible, non-transitory, computer-readable medium of claim 17, wherein the instructions that cause the processor to apply the slope-based analysis, the mean value based analysis, the first order derivative, or the combination thereof, comprise instructions that that when executed by the processor cause the processor to compare a first slope of the first time period data to a second slope of a second time period data, compare a first mean value of the first time period data to a second mean value of the second time period data, compare a first first order derivative of the first time period data to a second first order derivative of the second time period data, or a combination thereof, wherein the second time period data comprises a different time period from the first time period.

19. The tangible, non-transitory, computer-readable medium of claim 16, further comprising instructions that that when executed by the processor cause the processor to update at least one of the one or more wind power system models based on the forecast.

20. The tangible, non-transitory, computer-readable medium of claim 16, wherein the one or more wind power system models comprise a wind speed prediction model, a wind power prediction model, a wind direction prediction model, an availability forecasting model, a condition based monitoring (CBM) model, an actual power curve model, a farm level model, or a combination thereof.

* * * * *